(12) United States Patent　　(10) Patent No.: US 12,587,755 B2
Nakata　　(45) Date of Patent: Mar. 24, 2026

(54) VEHICLE-MOUNTED CONTROL DEVICE, AND THREE-DIMENSIONAL INFORMATION ACQUISITION METHOD

(71) Applicant: Hitachi Astemo, Ltd., Hitachinaka (JP)

(72) Inventor: Hiroaki Nakata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/702,734

(22) PCT Filed: Jul. 29, 2022

(86) PCT No.: PCT/JP2022/029252
§ 371 (c)(1),
(2) Date: Apr. 18, 2024

(87) PCT Pub. No.: WO2023/067867
PCT Pub. Date: Apr. 27, 2023

(65) Prior Publication Data
US 2025/0126372 A1　Apr. 17, 2025

(30) Foreign Application Priority Data

Oct. 21, 2021　(JP) ................................. 2021-172264

(51) Int. Cl.
*H04N 25/532* (2023.01)
*G06T 7/55* (2017.01)
(Continued)

(52) U.S. Cl.
CPC ............. *H04N 25/532* (2023.01); *G06T 7/55* (2017.01); *H04N 23/671* (2023.01);
(Continued)

(58) Field of Classification Search
CPC .... H04N 23/73; H04N 25/532; H04N 25/531; H04N 25/535; H04N 25/533;
(Continued)

(56) References Cited

U.S. PATENT DOCUMENTS

| 11,398,045 B2 * | 7/2022 | Yoshida | .................. G06T 7/521 |
| 11,933,599 B2 * | 3/2024 | Lee | ........................... G06T 7/55 |

(Continued)

FOREIGN PATENT DOCUMENTS

| JP | 2012-198075 A | 10/2012 |
| JP | 2019-128153 A | 8/2019 |

(Continued)

OTHER PUBLICATIONS

International Search Report issued in International PCT Application No. PCT/JP2022/029252 dated Sep. 27, 2022, with English Translation.

*Primary Examiner* — Boubacar Abdou Tchoussou
(74) *Attorney, Agent, or Firm* — Foley & Lardner LLP

(57) ABSTRACT

To provide a vehicle-mounted control device that suppress a ranging error by controlling an imaging start timing of a rolling-shutter type camera according to a situation when acquiring the three-dimensional information around the vehicle based on a pair of still images captured by a pair of the cameras including at least one rolling-shutter type camera. The vehicle-mounted control device communicates with a plurality of cameras including a first camera with a rolling-shutter type image sensor. The vehicle-mounted control device includes: a ranging unit that measures a distance (Continued)

to a ranging target using a plurality of images captured with a first camera and a second camera, the second camera being capable of capturing a same ranging target in at least part of an image capturing region of the first camera; and an exposure timing adjusting unit that adjusts an exposure timing of at least one of the first camera or the second camera based on a ranging position of at least one of the plurality of images.

10 Claims, 9 Drawing Sheets

(51) Int. Cl.

| | |
|---|---|
| *H04N 23/67* | (2023.01) |
| *H04N 23/73* | (2023.01) |
| *H04N 23/90* | (2023.01) |
| *H04N 25/535* | (2023.01) |

(52) U.S. Cl.
CPC ............. *H04N 23/73* (2023.01); *H04N 23/90* (2023.01); *H04N 25/535* (2023.01); *G06T 2207/10028* (2013.01); *G06T 2207/30261* (2013.01)

(58) Field of Classification Search
CPC .......... H04N 25/53; H04N 25/50; G06T 7/55; G06T 2207/30261; G06T 2207/10028; G01C 3/06
See application file for complete search history.

(56) References Cited

U.S. PATENT DOCUMENTS

| | | | | |
|---|---|---|---|---|
| 2012/0236124 | A1 | 9/2012 | Aoki | |
| 2013/0129150 | A1* | 5/2013 | Saito | G06V 20/58 |
| | | | | 382/104 |
| 2013/0258139 | A1* | 10/2013 | Omori | H04N 5/265 |
| | | | | 348/239 |
| 2017/0041591 | A1* | 2/2017 | Korogi | H04N 23/71 |
| 2021/0341616 | A1 | 11/2021 | Saito | |
| 2022/0394156 | A1* | 12/2022 | Benemann | G06T 5/80 |
| 2023/0328388 | A1* | 10/2023 | Lu | H04N 25/626 |
| | | | | 348/262 |

FOREIGN PATENT DOCUMENTS

| | | |
|---|---|---|
| JP | 2020-194400 A | 12/2020 |
| WO | WO-2020/075525 A1 | 4/2020 |

* cited by examiner

*FIG. 8*

LEFT IMAGE Il₃

RIGHT IMAGE Ir₃

LEFT IMAGE Il₃

RIGHT IMAGE Ir₃ₐ

LEFT IMAGE Il₃

RIGHT IMAGE Ir₃ᵦ

VEHICLE-MOUNTED CONTROL DEVICE, AND THREE-DIMENSIONAL INFORMATION ACQUISITION METHOD

TECHNICAL FIELD

The present invention relates to a vehicle-mounted control device and a three-dimensional information acquisition method that acquire three-dimensional information around a vehicle based on a pair of still images captured by a pair of vehicle-mounted cameras.

BACKGROUND ART

In recent years, as part of the development of technologies for advanced driver assistance systems (ADAS) and autonomous driving (AD), technologies have been developed to accurately assess a surrounding situation of a vehicle. One type of external sensor used to assess the surrounding situation of the vehicle is a camera, which can acquire images of the surrounding situation in the same way as the human eye does. However, from a still image taken by a single camera from a single viewpoint, it is not possible, in principle, to measure a distance to a captured object.

Therefore, a sensor fusion system has been proposed to measure the distance to the object that cannot be measured by a single camera in combination with LiDAR, which is a ranging device (for example, Patent Literature 1).

However, the sensor fusion system of Patent Literature 1 is described in the abstract of the same document as follows: "Provided is a sensor fusion system comprising: a ranging device having a light source module, a light source control unit, and a light receiving part, the light source module including a light source unit; an imaging device having a pixel unit, an A/D converter, and an exposure control unit; and a synchronization control unit that controls the light source control unit and the exposure control unit such that a timing at which the light source unit emits light to a prescribed region and a timing at which a pixel group corresponding to the prescribed region is exposed are synchronized." As stated above, it is necessary to synchronize the sensing timing of the image capturing device (camera) and a ranging device (LiDAR) in a given region. Thus, the problem is that the sensing control becomes complicated. In general, the LiDAR is more expensive than the cameras, thus, there is also the problem of rising production costs in the sensor fusion system of Patent Literature 1 that uses the LiDAR compared with a ranging system that does not use LiDAR.

Because of those problems, when an ADAS and an AD are to be implemented relatively inexpensively, stereo cameras, which are easier to control sensing and less expensive than the sensor fusion systems, are often used. When using the stereo cameras, since the relationship between positions and postures (viewing direction) of the left and right cameras are known, the distance to the ranging target around the vehicle (three-dimensional information) can be calculated using the method of triangulation by obtaining the parallax by mapping the same target portions in the left and right images captured by the left and right cameras using, such as a pattern matching method.

CITATION LIST

Patent Literature

Patent Literature 1: WO2020/075525

SUMMARY OF INVENTION

Technical Problem

By the way, some recent vehicles are equipped with monocular cameras mounted at various positions and in various orientations on the vehicle to monitor each direction around the vehicle. Therefore, by combining captured images from any two monocular cameras with overlapping image capturing areas, it is possible to acquire three-dimensional information around the vehicle using the method of triangulation described above, even in directions not monitored by the stereo camera. To do this, it is sufficient that the image capturing timings of the two monocular cameras are synchronized such that the overlapping image capturing areas are captured simultaneously.

However, when at least one of the two monocular cameras is a camera that employs a rolling-shutter type image sensor such as a CMOS sensor (an image sensor that sequentially captures images by shifting exposure timing for each image capturing line on the light receiving surface), even when the start timings of the image capturing by the two monocular cameras are synchronized, the exposure timing of one monocular camera capturing an object from a certain position in a certain direction (that is, the vertical position of the image capturing line on the side of one monocular camera) and the exposure timing of the other monocular camera capturing the same object from another position in a different direction (that is, the vertical position of the image capturing line on the side of the other monocular camera) may differ. In this case, there is a problem that an error occurs in the distance measurement of the object due to the change in the relative positions of the vehicle (camera) and the ranging target that occurs during the period corresponding to the difference in the exposure timing (difference in the vertical positions of the image capturing lines of both the cameras).

Therefore, it is an object of the present invention to provide a vehicle-mounted control device or a three-dimensional information acquisition method that suppress a ranging error by controlling an imaging start timing of a rolling-shutter type camera according to a situation when acquiring the three-dimensional information around the vehicle based on a pair of still images captured by a pair of the cameras including at least one rolling-shutter type camera.

Solution to Problem

A vehicle-mounted control device communicates with a plurality of cameras including a first camera with a rolling-shutter type image sensor. The vehicle-mounted control device includes: a ranging unit that measures a distance to a ranging target using a plurality of images captured with a first camera and a second camera, the second camera being capable of capturing a same ranging target in at least part of an image capturing region of the first camera; and an exposure timing adjusting unit that adjusts an exposure timing of at least one of the first camera or the second camera based on a ranging position of at least one of the plurality of images.

Advantageous Effects of Invention

According to a vehicle-mounted control device or a three-dimensional information acquisition method, it is possible to suppress a ranging error by controlling an imaging start timing of a rolling-shutter type camera according to a situation when acquiring the three-dimensional information around the vehicle based on a pair of still images captured by a pair of the cameras including at least one rolling-shutter type camera.

BRIEF DESCRIPTION OF DRAWINGS

FIG. 8 is an example illustrating the exposure timing relationship between the left and right cameras according to Modification 1.

DESCRIPTION OF EMBODIMENTS

Embodiments of a vehicle-mounted control device and a three-dimensional information acquisition method of the present invention are described below with reference to the drawings.

Embodiment 1

First, the vehicle-mounted control device 1 according to Embodiment 1 of the present invention is described with reference to FIGS. 1 to 12.

Figure 1:
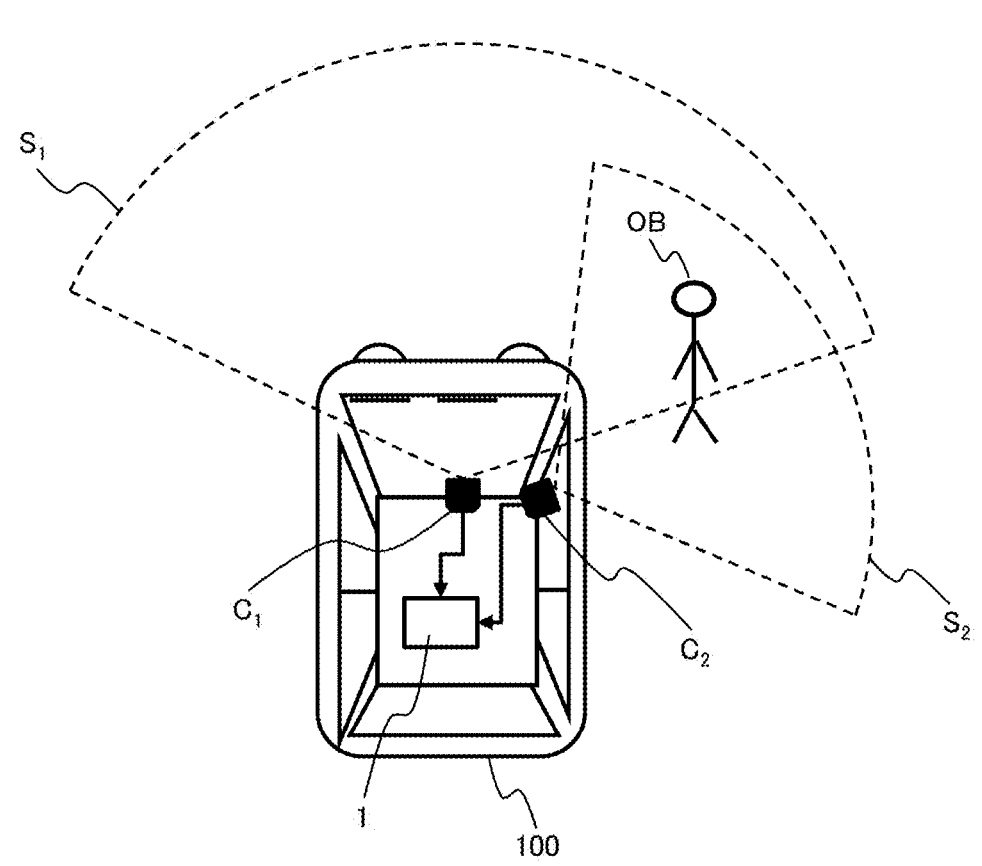
FIG. 1 is a plan view of mounting positions of two cameras on a vehicle in Embodiment 1.

FIG. 1 is a plan view from above of a vehicle 100 including the vehicle-mounted control device 1 of the embodiment. A positional relationship among: two cameras C (a camera $C_1$ capturing a front and a camera $C_2$ capturing a right front) mounted on the vehicle 100; image capturing areas S of both cameras (an image capturing area $S_1$ for camera $C_1$, and an image capturing area $S_2$ for camera $C_2$); and a pedestrian being captured by both cameras (hereinafter referred to as "ranging target OB") is exemplarily described.

Although only the two cameras $C_1$ and $C_2$ are illustrated as an example in FIG. 1, a plurality of cameras (not illustrated) are also mounted on the vehicle 100 for image capturing of each direction, such as right direction, right rear direction, rearward direction, left rear direction, left direction, and left forward direction such that the image capturing areas of respective cameras overlap. Therefore, use of a pair of images captured by any two cameras having overlapping image capturing areas allows acquiring three-dimensional information in any direction. The following is a detailed description of the vehicle-mounted control device 1 in this embodiment taking as an example of a situation of acquiring three-dimensional information of the ranging target OB in the right front of the vehicle based on the captured images of cameras $C_1$ and $C_2$.

Figure 2:
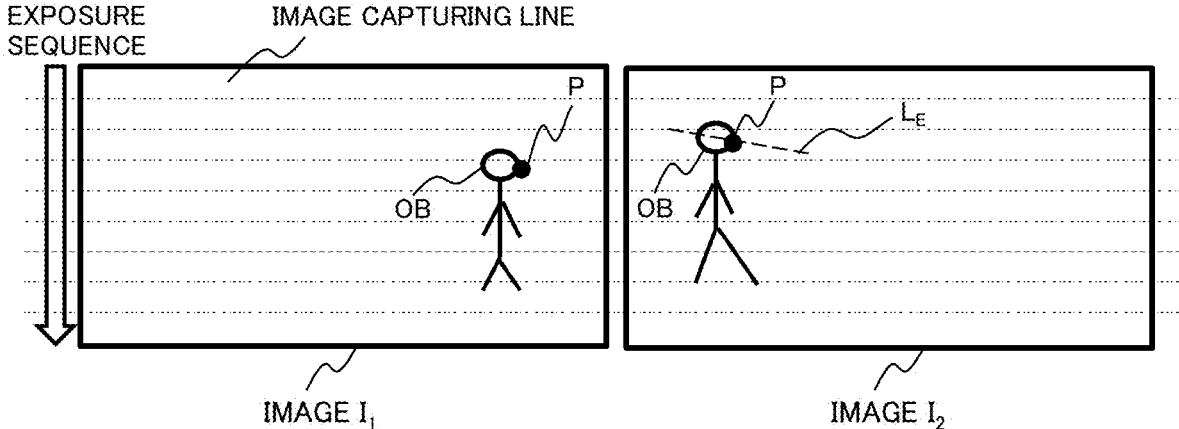
FIG. 2 is an example of two still images captured synchronously by the two cameras in FIG. 1.

FIG. 2 illustrates an example of Image I captured by both cameras in an environment illustrated in FIG. 1 when the vehicle 100 and the ranging target OB are both stopped and the cameras $C_1$ and $C_2$ are both rolling-shutter type cameras that sequentially perform exposure from the top to the bottom image capturing lines. In this example, the same ranging target OB is captured in both Image $I_1$ captured by the camera $C_1$ and Image $I_2$ captured by the camera $C_2$. Here, a point P is used as a feature point for measuring a distance from the vehicle 100 to the ranging target OB. Note that the image capturing lines in FIG. 2 are a notion to illustrate the invention, and the actual image capturing lines have a higher resolution than illustrated.

When Image $I_1$ is the reference image, the point P on Image $I_1$ will appear somewhere on an epipolar line $L_E$ on Image $I_2$ depending on a distance to the point P based on an epipolar geometry, when there is no distortion in both images. The distance to the point P can then be calculated based on where the point P present on the epipolar line $L_z$ on Image 12.

Figure 3:
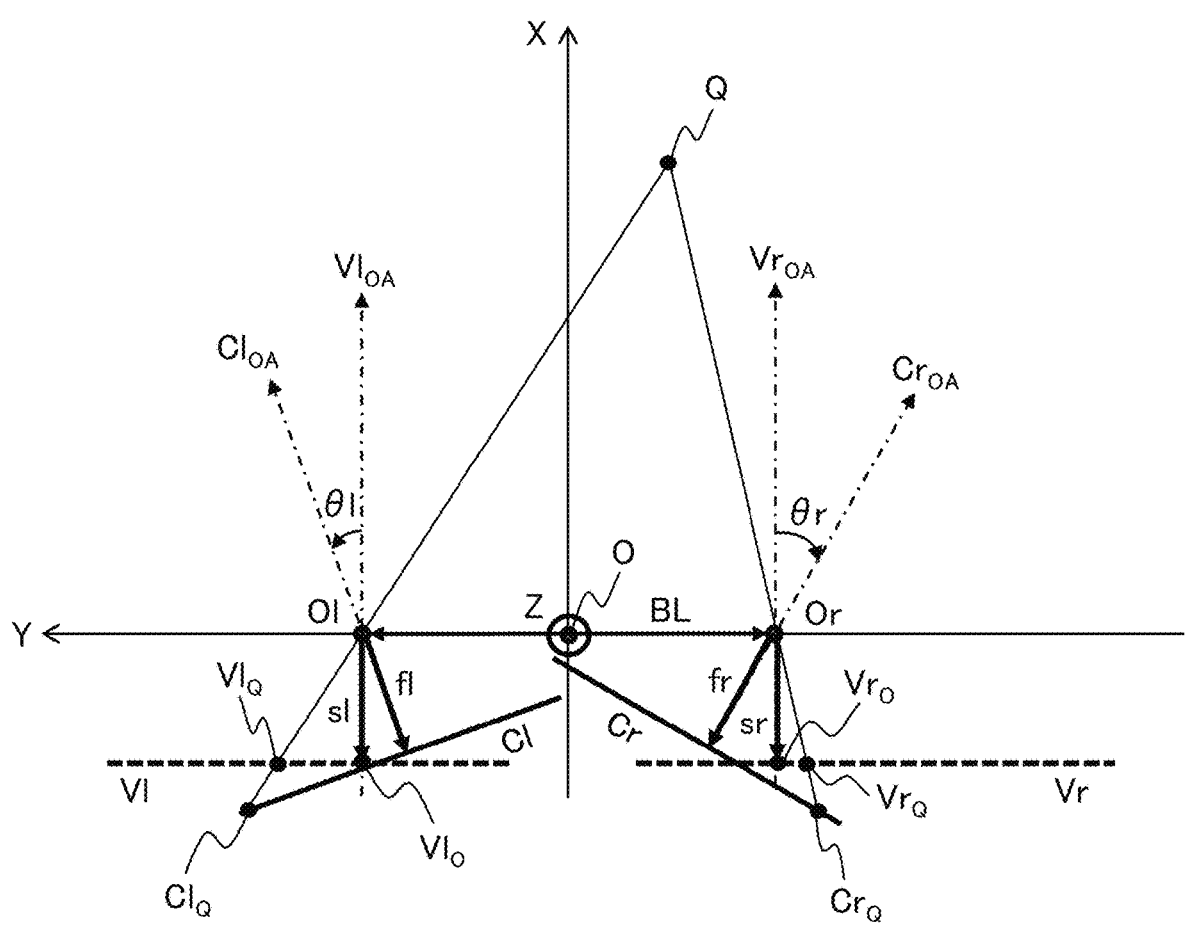
FIG. 3 is an example of a relationship between optical specifications of two real cameras with non-parallel optical axes and two virtual cameras with parallel optical axes.

Here, FIG. 3 is used to illustrate an example of a method for measuring the distance to a ranging target point by stereo vision based on a pair of still images captured by two cameras mounted on the vehicle 100 whose optical axes are not parallel to each other.

In FIG. 3, a point Ol is the optical center of the camera on the relative left side (corresponding to the camera $C_1$ in FIG. 1, hereinafter referred to as the "left camera"), and a point Or is the optical center of the camera on the relative right side (corresponding to the camera $C_2$ in FIG. 1, hereinafter referred to as the "right camera"). A line segment BL is a baseline connecting both optical centers, and a length thereof is a distance between the points Ol and Or.

The coordinate system illustrated in FIG. 3 is a Cartesian coordinate system consisting of three axes, X-, Y-, and Z-axes, with the center point O of the line segment BL described above as the origin. In this Cartesian coordinate system, the Y-axis overlaps the line segment BL, the X-axis is orthogonal to the Y-axis, the Z-axis is orthogonal to the X- and Y-axes, and the optical axes of the left and right cameras are on the XY plane. The X-axis is defined to have a positive direction away from the vehicle, the Y-axis is defined to have a positive direction to the left, and the Z-axis is defined to have a positive direction up.

Specifications of the left camera are defined by the left camera optical axis $Cl_{OA}$, the left camera image sensor surface Cl (a plane indicated by a thick solid line), and the left camera focal length fl in the figure, and specifications of the right camera are defined by the right camera optical axis $Cr_{OA}$, the right camera image sensor surface Cr (a plane indicated by a thick solid line), and the right camera focal length fr in the figure.

In addition to the real left and right cameras, consider a virtual left and right camera that is supposed to realize parallel stereo vision equivalent to a common stereo camera. For this virtual camera V, specifications of the virtual left camera are defined by a virtual left camera optical axis $Vl_{OA}$, a virtual left camera image sensor surface Vl (a plane indicated by a bold dashed line), and a virtual left camera focal length sl in the figure. Specifications of the virtual right camera are defined by a virtual right camera optical axis $Vr_{OA}$, a virtual right camera image sensor surface Vr (a plane indicated by a bold dashed line), and a virtual right camera focal length sr in the figure. The virtual left camera focal length sl and the virtual right camera focal length sr are assumed to be the same. The optical center of the virtual left camera is located at the same point Ol as the optical center of the real left camera, and the optical center of the virtual right camera is located at the same point Or as the optical center of the real right camera. The virtual left camera image sensor surface Vl and the virtual right camera image sensor surface Vr are both set to a plane parallel to the YZ plane. Each image sensor surface is perpendicular to the optical axis corresponding to each plane.

Let us consider a situation where the distance to a point Q in space, which is in the image capturing areas of the real left and right cameras, is to be measured. In the real left camera, the point Q is projected onto point $Cl_Q$ on the left camera image sensor surface Cl. In this case, as can be seen from FIG. 3, the point $Vl_Q$ where a line connecting the point Ol and the point $Cl_Q$ intersects the virtual left camera image sensor surface Vl is a position of the point Q projected on the virtual left camera image sensor surface Vl. In other words, when a relationship between the postures of the virtual left camera and the left camera (for example, θ1 as an angle between their optical axes) both with the point Ol as the optical center, the left camera focal length fl, and the virtual left camera focal length sl are known, the position of the point $Vl_Q$ projected on the virtual left camera image sensor surface Vl can be determined from the position of the point $Cl_Q$ projected on the left camera image sensor surface Cl. Similarly, the position of the point $Vr_Q$ projected on the virtual right camera image sensor surface Vr can be obtained from the position of the point $Cr_Q$ projected on the right camera image sensor surface Cr.

In FIG. 3, the virtual left camera optical axis $Vl_{OA}$ and the virtual right camera optical axis $Vr_{OA}$ are set parallel to each other, assuming a configuration in which the left camera optical axis $Cl_{OA}$ and the right camera optical axis $Cr_{OA}$ are both located on the XY plane. The optical axes of the real left and right cameras are three-dimensionally rotated (specifically, the optical axes of the left and right cameras tilted in a direction of any elevation or tilt angle) within a range where the point Q as the ranging target can be captured. Even when the left camera optical axis $Cl_{OA}$ and the right camera optical axis $Cr_{OA}$ are configured to intersect the XY plane only on the Y-axis, similarly to FIG. 3, the virtual left camera optical axis $Vl_{OA}$ and the virtual right camera optical axis $Vr_{OA}$, which are parallel to each other, can be set to obtain the positions of the point $Vl_Q$ and the point $Vr_Q$ described above.

Therefore, the virtual left image virtually captured by the left virtual camera can be calculated from the left image Il captured by the real left camera, and the virtual right image virtually captured by the right virtual camera can be calculated from the right image Ir captured by the real right camera. Since the left and right virtual cameras in FIG. 3 constitute virtual parallel stereo cameras, the distance to the ranging target OB can be calculated in a manner of triangulation based on the virtual left image and the virtual right image.

<Projected Position of the Point Q on the Image Sensor Surface of the Virtual Camera V>

Figure 4:
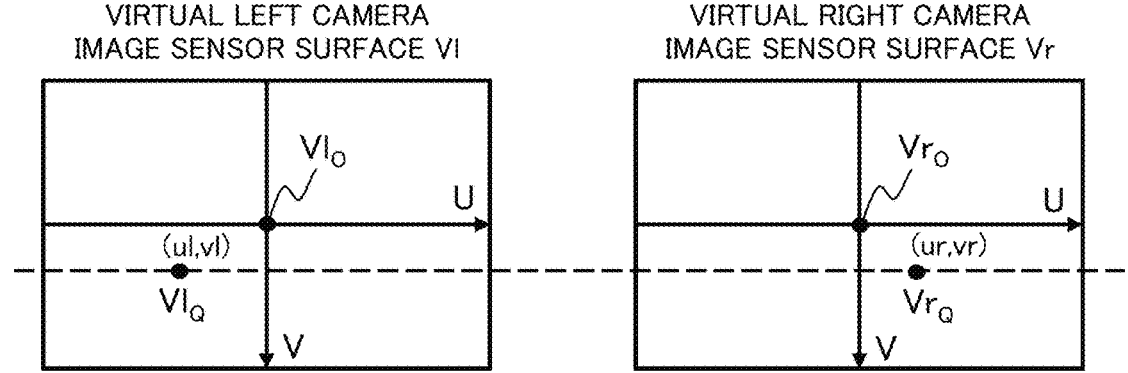
FIG. 4 is an example of a position of a point Q projected on an image sensor surface of the virtual camera in FIG. 3.

FIG. 4 illustrates a view of the virtual left camera image sensor surface Vl and the virtual right camera image sensor surface Vr in FIG. 3 viewed from the negative direction of the X-axis. FIG. 4 is used to describe a relationship between a position on the image sensor surface and a distance to the ranging target OB in a virtually parallel stereo camera.

In FIG. 4, U-axis and V-axis are defined as the coordinate system on the left and right image sensor surfaces, the origin of the virtual left camera image sensor surface Vl is the point $Vl_O$, and the origin of the virtual right camera image sensor surface Vr is the point $Vr_O$. As illustrated in FIG. 3, the point $Vl_O$ is located at the intersection of the virtual left camera image sensor surface Vl and the virtual left camera optical axis $Vl_{OA}$, and the point $Vr_O$ is located at the intersection of the virtual right camera image sensor surface Vr and the virtual right camera optical axis $Vr_{OA}$.

When the coordinate of the image sensor surface is expressed in a form (U coordinate, V coordinate), the coordinate of the point Q (that is, the point $Vl_Q$) projected on the virtual left camera image sensor surface Vl is (ul, vl), and when the coordinate of the point Q (that is, the point $Vr_Q$) projected on the virtual right camera image sensor surface Vr is (ur, vr), the distance D from the YZ plane to the point Q in FIG. 3, that is, the value of the X coordinate of the point Q, can be expressed in Formula 1.

[Math. 1]

$$D = (s \times d)/(ur - ul) \qquad \text{(Formula 1)}$$

Here, s is the virtual left camera focal length sl (or the equivalent virtual right camera focal length sr), and d is a length of the line segment BL (baseline length).

Formula (2) can express yr and vl.

[Math. 2]

$$vr = vl = s \times z/x \qquad \text{(Formula 2)}$$

Here, x is a X coordinate of the point Q in FIG. 3 (i.e., equal to distance D), and z is a Z coordinate of the point Q in FIG. 3. As Formula 2 illustrates, the V-coordinates of the left and right image sensor surfaces coincide in a parallel stereo camera consisting of the same two cameras without distortion. That is, even when the two cameras use the rolling-shutter type image sensors, synchronously operating the two cameras projects the point Q on the same image capturing line (vertical position) on the image sensor surface of the left and right cameras. Thus, the point on the image used to calculate the distance D can be exposed simultaneously by both cameras.

<An Example of the Relationship Between Left and Right Images>

Figure 5:
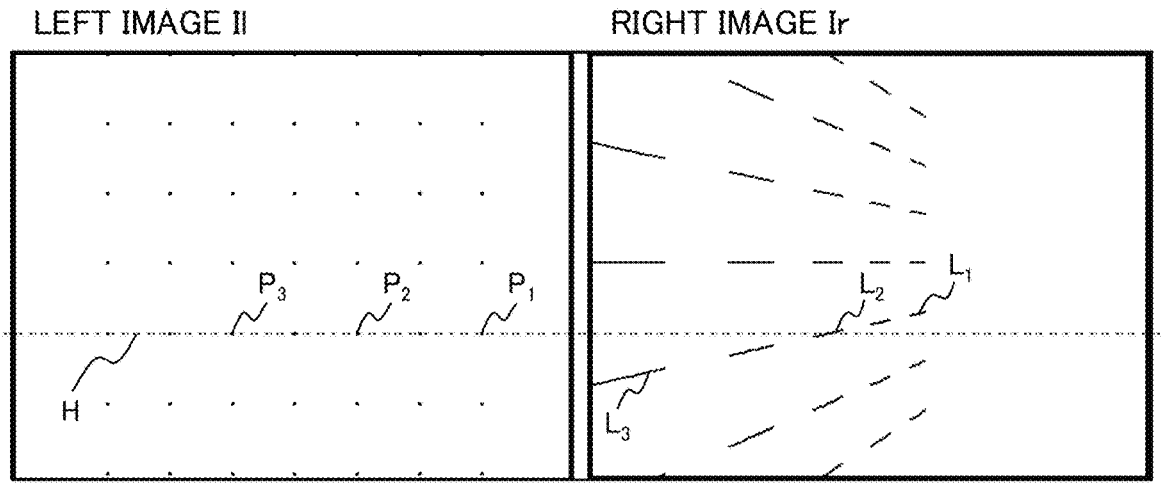
FIG. 5 is an example of how a point captured by the left camera in Embodiment 1 is captured by the right camera.

FIG. 5 illustrates an example of how a point captured as an image by the left camera can be captured by the right camera in FIG. 3, in a situation where the focal lengths fl and fr are the same for the left and right cameras, the real left camera has the same posture as the left virtual camera ($\theta l$=0°), and the real right camera is rotated 30 degrees to the right ($\theta r$=30°) from the right virtual camera around a line parallel to the Z-axis passing through the point Or.

Assuming that the image captured by the left camera is the left image Il and the image captured by the right camera is the right image Ir, the left image Il corresponds to the image of the left camera image sensor surface Cl. In the virtual left camera image sensor surface Vl in FIG. 4, since the image is inverted vertically and horizontally because of the camera lens, the image is inverted vertically and horizontally again and illustrated in the original orientation in FIG. 5. The same is true for the right image Ir. Hereafter, the orientation of the image captured by the camera is illustrated in the same orientation as in FIG. 5.

Since the right image Ir illustrates a summary of a case when the distance to each point illustrated in the left image Il varies within a certain range, each point in the left image Il become a line segment in the right image Ir. That is, a point on the left image Il appears somewhere in a corresponding line segment in the right image Ir, or a straight line extending the line segment depending on a distance to the point, and conversely, the distance to the point can be calculated based on where the point appears on the line segment or the line.

Although each point in the left image Il is illustrated as corresponding to each line segment in the right image Ir, some of the points on the left image Il are outside the range of the right image Ir due to the difference in the imaging range of the left and right cameras. To illustrate some point and line segment correspondences as an example, the points $P_1$, $P_2$, and $P_3$ in the left image Il correspond to the line segments $L_1$, $L_2$, and $L_3$ in the right image Ir, respectively.

In FIG. 5, when comparing the vertical position of the image capturing line H (vertical position) where the points $P_1$, $P_2$, and $P_3$ are present in the left image Il with the vertical positions of the line segments $L_1$, $L_2$, and $L_3$ in the right image Ir, the line segment $L_1$ is above the image capturing line H, the line segment $L_2$ is approximately at the position of the image capturing line H, and the line segment $L_3$ is below the image capturing line H. Therefore, when the image capturing timing of the left camera and the right camera of the rolling-shutter type are synchronized, and both the left image Il and the right image Ir are exposed sequentially from the above image capturing line to the below image capturing line at the same rate, a deviation in exposure time occurs for the point $P_1$ where the right image Ir is exposed earlier than the left image Il, and conversely, the right image Ir is exposed later than the left image Il, resulting in a deviation in exposure time for the point $P_3$.

This exposure time deviation is a major problem in situations such as the vehicle-mounted cameras, where the relative relationship between the position of camera C (a position of the vehicle 100) and the position of the ranging target OB changes from moment to moment. This is because not only the effect of parallax, but also the change in the relative positional relationship between the camera and the ranging target OB during the period corresponding to the exposure time deviation appears as the difference between the left image Il and the right image Ir. Thus, the relationship between the positions of the ranging target points on the left image Il and the right image Ir necessary to measure the distance to the ranging target point is affected, thus causing a ranging error. Therefore, in order to suppress the ranging error caused by the exposure time deviation, it is necessary to suppress the difference in exposure time between the left and right cameras according to the projected position of the ranging target point.

<Exposure Time Difference Suppression Method>

Figure 6:
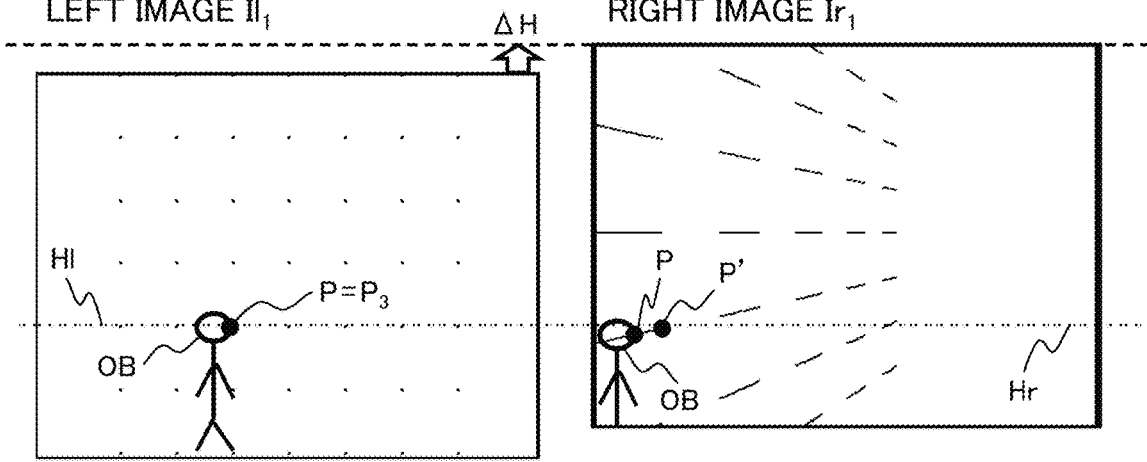
FIG. 6 is an example of how to simultaneously expose the same point with the left and right cameras according to Embodiment 1.

Next, FIG. 6 is used to describe a method for suppressing the difference in exposure time when the same ranging target OB is captured by the left and right cameras. FIG. 6 illustrates an example of the ranging target OB and the point P as the feature point used to measure the distance to the ranging target OB, in the left and right images captured by the left and right cameras under the same installation conditions as in FIG. 5. For description purposes, the left image $Il_i$ in FIG. 6 illustrates the points on the same image as the left image Il in FIG. 5, and the right image $Ir_1$ in FIG. 6 also illustrates the line segments on the same image as the right image Ir in FIG. 5. The image capturing line Hl, which indicates the vertical position of the point P in the left image, and the image capturing line Hr, which indicates the vertical position of the point P' in the right image, are also illustrated. The point P' is a position of the point P on the right image assuming that the point P is located at the maximum distance to be covered by a ranging target scope.

The feature point (the point P) of the ranging target OB is assumed to be at the same location as the point $P_3$ in the left image Il in FIG. 5. In this case, assuming that the exposure start times of the left and right cameras are the same, the point P in the left image $Il_i$ in FIG. 6 will be located on the line segment $L_3$ (or a straight line overlapping the line segment) in the right image Ir in FIG. 5. In this case, the exposure timing of the line segment $L_3$ by the right camera will be delayed compared with the exposure timing of the point $P_3$ by the left camera, as described above. Therefore, in order to suppress the exposure timing deviation between the point $P_3$ and the line segment $L_3$, it is considered that the vertical position of the line segment $L_3$ (or the straight line overlapping the line segment) in the right image Ir of FIG. 5 is made closer to the image capturing line H of FIG. 5 (the image capturing line Hl in FIG. 6).

Since the line segment $L_3$ in the right image Ir corresponding to the point $P_3$ in the left image Il is not necessarily horizontal, it is necessary to determine which point on the line segment $L_3$ or the line that overlaps the line segment should be adjusted to the vertical position of the image capturing line H (Hl). According to the relationship illustrated in Formula 1, the change in position on the image decreases inversely proportional to the distance to the ranging target OB. Thus the farther the distance is, the more sensitive it becomes to the deviation in position on the image. Considering the effect of suppressing the substantial ranging error, the point corresponding to the maximum distance to be covered by the ranging target scope is determined. In the right image $Ir_1$ of FIG. 6, this point is illustrated as point P'.

The maximum distance covered by the ranging target scope is determined by taking into account a purpose of the distance measurement, for example, to confirm a distance to a traffic participant walking on a crosswalk at a large intersection. At this time, a camera that can provide an effective resolution needed to measure the maximum distance, an accuracy of a mounting orientation of the camera, an accuracy of a calibration of the camera performed at the time it is mounted on the vehicle, and the sensing error correction function when the vehicle is in operation are considered.

Since the camera calibration is already commonly implemented, the description of the method is omitted. The sensing error correction function has already been implemented, the detailed description is omitted. For example, for an object such as a sign or a traffic light certain to be fixed while a vehicle is stopped, there is a method, for example, sensing deviation of each sensor is detected and corrected by comparing the detection positions of the object by a plurality of camera images and another external sensor.

In FIG. 6, when the vertical position of the point P' on the right image $Ir_1$, that is, the image capturing line Hr of the point P' is known, it is possible to find how many image capturing lines of difference between the image capturing timings of the left image $Il_1$ and the right image $Ir_1$ allow simultaneously capturing the point P with the left and right cameras. The difference in the exposure start time can then be calculated from the deviation of the exposure time per image capturing line, which can be determined by an operating parameter of the image sensor. Therefore, providing a signal for frame timing control, such as a synchronization signal, to the respective left camera and the right camera to align the calculated timing allows aligning the timings of exposure of the point P by the left and right cameras to suppress the ranging error of the point P.

When the image capturing line of the point P on the left image $Il_1$ is Hl and the image capturing line of the point P' on the right image $Ir_1$ is Hr as illustrated in FIG. 6, accelerating the image capturing timing of the right camera by a time corresponding to the exposure time of the image capturing line $\Delta H$, which is the difference between Hl and Hr, allows simultaneously capturing the point P on the left image $Il_1$ and the point P' on the right image $Ir_1$. As a result, since the left and right images capture the ranging target OB at approximately the same time, the position of the point P can be accurately measured based on the virtual left and right images calculated from these left and right images.

<Modification 1>

Figure 8:
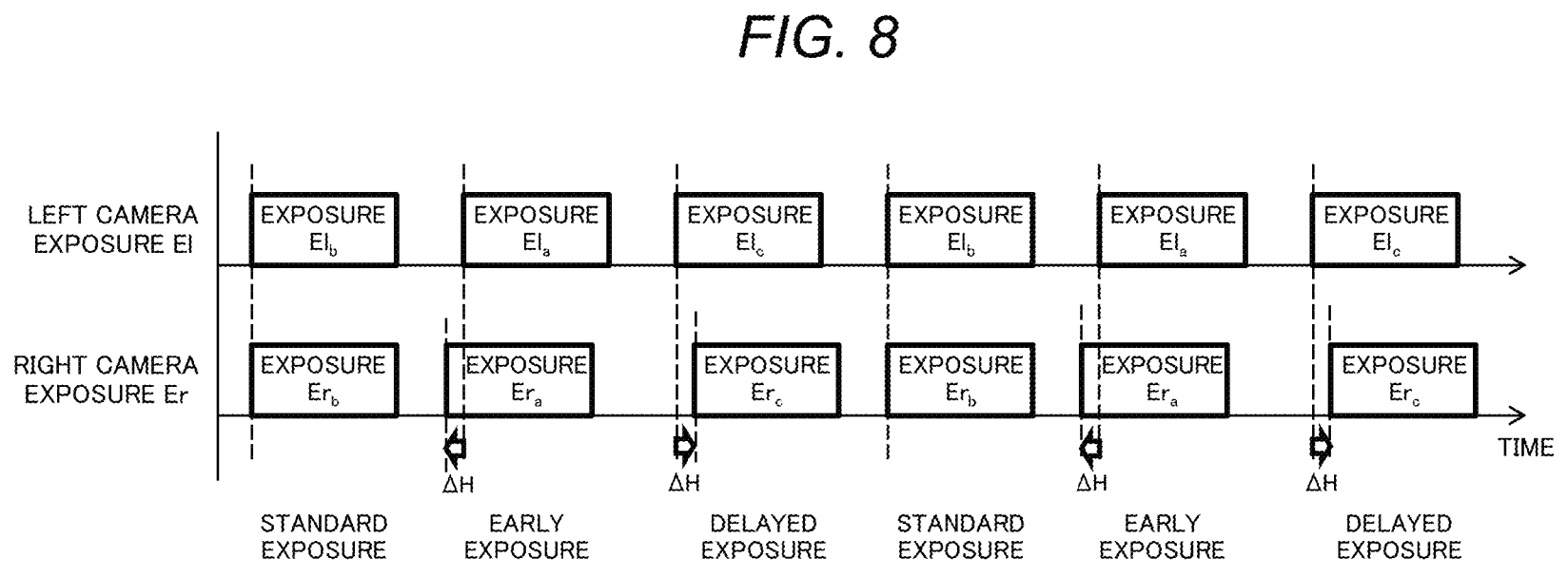

Next, FIG. 7 and FIG. 8 are used to describe Modification 1 of this embodiment. In the method described using FIG. 6, after the point P as the ranging target is identified on the image, an appropriate correction amount of the image capturing timing (corresponding to a time required for the exposure of $\Delta H$ lines) is determined. Furthermore, it is necessary to measure a distance to the ranging target point based on the left and right images with the adjusted image capturing timings. In other words, only one specific point (point P) was basically the ranging target point that was able to be accurately measured by the method in FIG. 6.

However, there are cases in which it is necessary to collectively measure a distance to the target present in units of region of interest in the image. Examples of the method to deal with such cases will be described using FIGS. 7A to 7C.

Figure 7A:
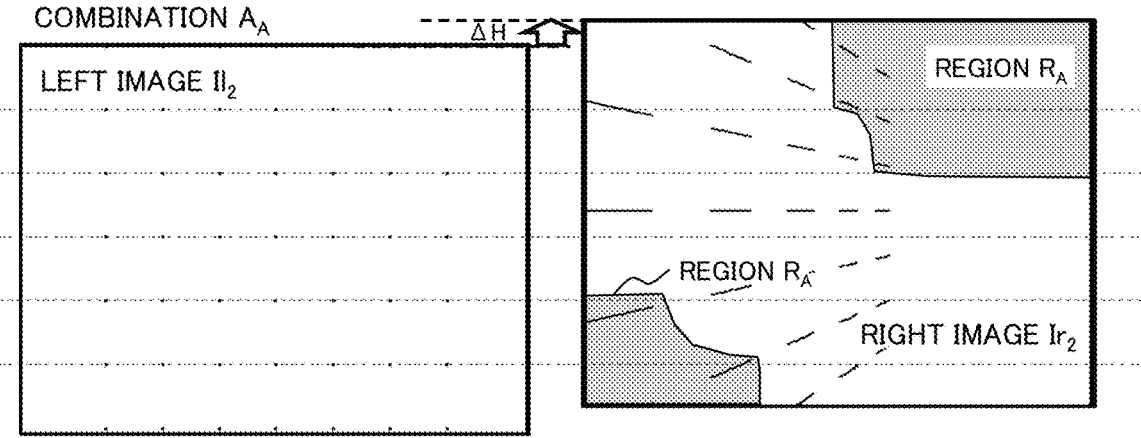
FIG. 7A is an example of dividing regions on the image and measuring the distance (combination $A_A$), based on Modification 1.
Figure 7B:
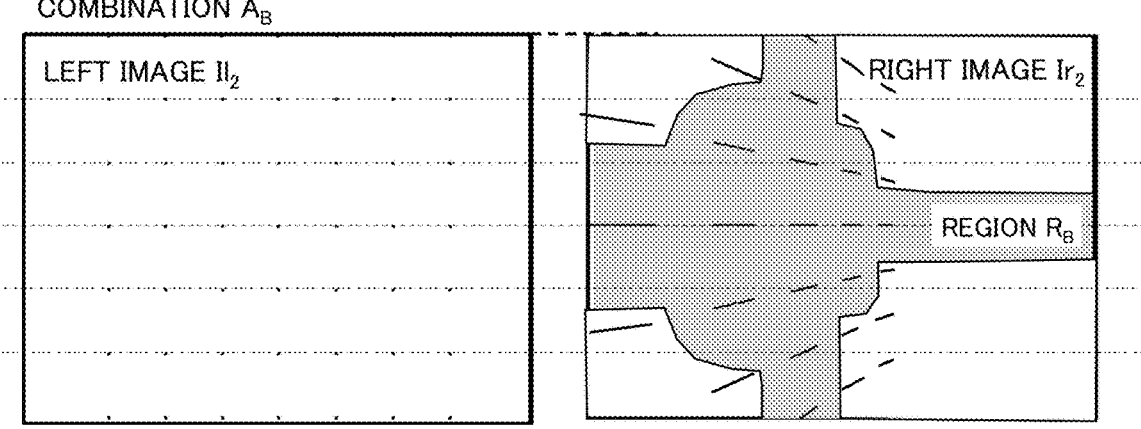
FIG. 7B is an example of dividing regions on the image and measuring the distance (Combination $A_B$) according to Modification 1.
Figure 7C:
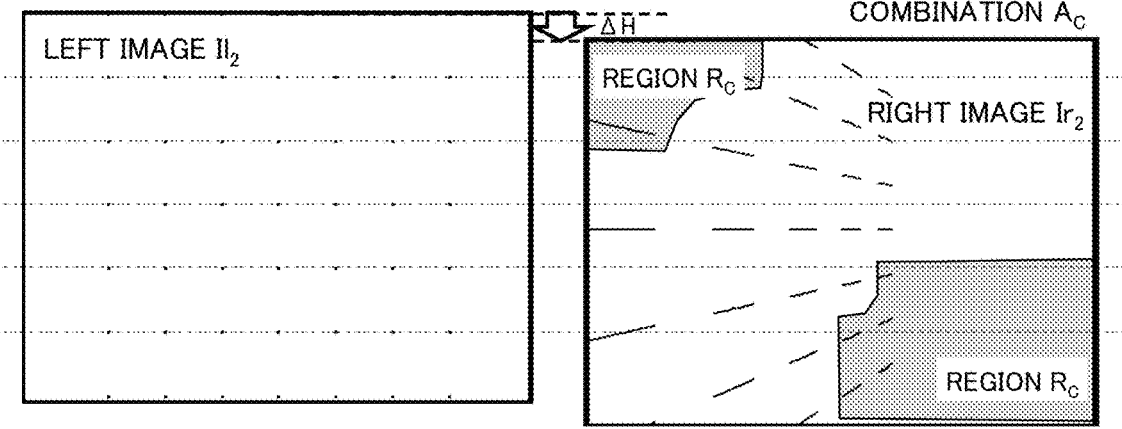
FIG. 7C is an example of dividing regions on the image and measuring the distance (Combination $A_C$) according to Modification 1.

In FIGS. 7A to 7C of this modification, the relationship of the exposure timing difference between the left image $Il_2$ and the right image $Ir_2$ is selected from three combinations prepared in advance. In a combination $A_A$ in FIG. 7A, the exposure timing of the right camera is earlier than an exposure timing of the left camera by a predetermined $\Delta H$ line. In a combination $A_B$ in FIG. 7B, the exposure timing of the left camera is aligned with an exposure timing of the right camera. In a combination $A_C$ in FIG. 7C, the exposure timing of the right camera is delayed by a predetermined $\Delta H$ line from an exposure timing of the left camera. Here, in each figure, the horizontal lines (dotted lines) are drawn to make it easier to see the position in the vertical direction of each point present in the left image $Il_2$.

The exposure is not actually instantaneous, but rather is performed for a certain period of time, taking into account an intensity of light reaching an image sensor and the sensitivity characteristics of the image sensor. In this specification, the exposure timing refers to a timing that is representative of the exposure period, such as a timing at which the exposure begins or a timing that is the center of the exposure period. However, the concept of timing representing the exposure period should be aligned to one.

In the combination $A_A$ in FIG. 7A, the difference in the positions in the vertical direction of the edges corresponding to the far side of the line segments (the right edge of each line segment in the right image Ir) present in the upper right and lower left portions of the regions $R_A$ in the right image $Ir_2$ is improved compared with the combination $A_B$. In contrast, in the combination $A_C$ in FIG. 7C, the difference in the positions in the vertical direction of the edges corresponding to the far side of the line segments present in the upper left and lower right portions of the regions $R_C$ in the right image $Ir_2$ is improved compared with the combination $A_B$. In other words, when the ranging target OB is in the region $R_A$ of the right image $Ir_2$, the frame exposure start timings of the image sensors of the left and right cameras are adjusted such that the exposure timings are as illustrated in the combination $A_A$ of FIG. 7A. When the ranging target OB is in the region $R_C$ of the right image $Ir_2$, the frame exposure start timings of the image sensors of the left and right cameras are adjusted such that the exposure timings are as illustrated in the combination $A_C$ in FIG. 7C. When the ranging target OB is in region $R_B$ of the right image $Ir_2$ (other than the regions $R_A$ or $R_C$), the frame exposure start timings of the image sensors of the left and right cameras are adjusted such that the exposure timings are as illustrated in the combination $A_B$ in FIG. 7B. In a region where there is the ranging target OB, it is possible to suppress the ranging error caused by the deviation in the exposure timing between the left and right cameras.

Compared with the imaging method in FIG. 6, which simultaneously captures the left and right image capturing lines projecting one specific point (the point P) of the ranging target OB, in the imaging method of the modification illustrated in FIGS. 7A to 7C, the deviation of the image capturing timing between the left and right image capturing lines including the point P may be larger. Thus, the ranging error is also somewhat larger. Compared with the case where the exposure timing relationship between the left and right cameras is always fixed (for example, always using the combination $A_B$ in FIG. 7B), it is possible to suppress the ranging error because the image capturing timings are controlled according to a ranging target region.

In order to suppress the ranging error even when the region is divided into smaller regions, it is sufficient that the region is divided into more regions and the difference in the exposure timing between the left camera and the right camera for each region is defined. Furthermore, it is conceivable to define the region by overlapping the region, select the region that best covers a target region desired to be distance measured, and define the difference in the exposure timing corresponding to the region.

FIG. 8 is used here to describe the method illustrated in FIGS. 7A to 7C for cases where it is desired to perform the method illustrated in FIGS. 7A to 7C without preliminary selecting the region to be used as the ranging target OB. FIG. 8 illustrates the exposure timing relationship between the left camera and the right camera. Especially when the number of regions is small, sequentially selecting the regions regardless of the selection result of the ranging target OB allows eliminating the effects of the delays caused by the recognition processing and the ranging region selection. This has the advantage of resulting in a faster distance measurement of the ranging target OB. In the case of sequential selection, in order to shorten the ranging interval for a particular region of high importance in the sequence, the region may be selected a plurality of times.

In addition, the plurality of sequences may be predefined, and the sequence may be switched depending on a surrounding situation, a travel state of the vehicle (a speed, a longitudinal acceleration, and a lateral acceleration), and a driving operation situation of the driver (a shift lever position and a steering angle). For example, the ranging interval in a region in front of the vehicle is shortened during a high-speed driving, when the lateral acceleration is occurring or a steering operation is being performed, the ranging interval in a region corresponding to the direction of travel is shortened, or the ranging interval using the camera available for rearward monitoring is shortened when traveling backward. Thus, it is possible to perform the distance measurement in the region of high importance depending on the situation.

Each exposure illustrated in FIG. 8 represents one frame of exposure by the image sensor. In the left camera, the exposures are repeated in this order of an exposure $El_b$, an exposure $El_a$, and an exposure $El_c$. In the right camera, the exposures are repeated in this order of an exposure $Er_b$, an exposure $Er_a$, and an exposure $Er_c$. In the combination of the exposure $El_b$ and the exposure $Er_b$, which corresponds to the above-described combination $A_B$, simultaneous exposures are performed with the left and right cameras. In the combination of the exposure $El_a$ and the exposure $Er_a$, which corresponds to the above-described combination $A_A$, the right camera performs the exposure by $\Delta H$ lines earlier than the left camera. In the combination of the exposure $El_c$ and the exposure $Er_a$, which corresponds to the above-described combination $A_C$, the right camera performs the exposure by $\Delta H$ lines later than the left camera. In other words, the exposure is performed by changing the exposure timing relationship between the left camera and the right camera in a pre-determined repetition. Thus, performing the exposures illustrated in FIG. 8 to use the exposure result with appropriate timing according to the region subject to the distance measurement allows suppressing the ranging error caused by the deviation in the exposure.

<Modification 2>

Figure 9:
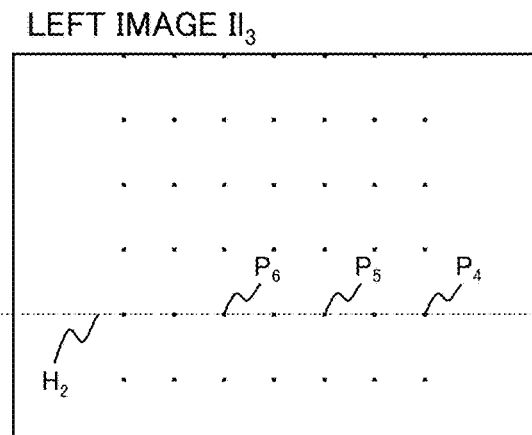
FIG. 9 is an example of how a point captured by the left camera in Modification 2 is capturing by the right camera.
Figure 9:
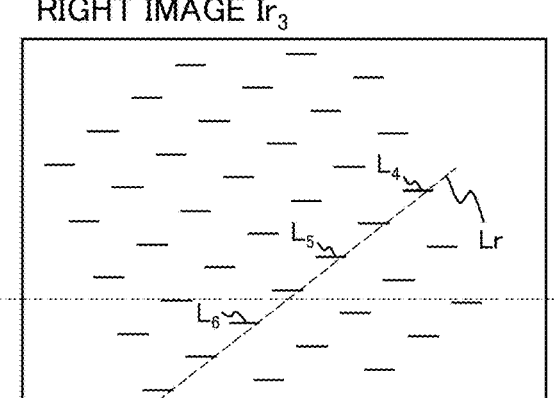
Figure 10A:
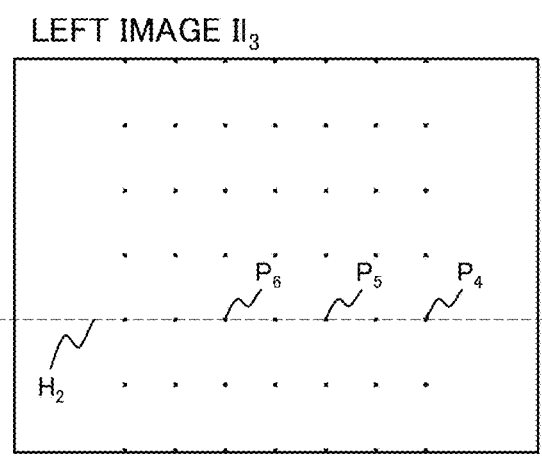
FIG. 10A is an example of how parallax errors appear under installation conditions of the left and right cameras in FIG. 9.
Figure 10A:
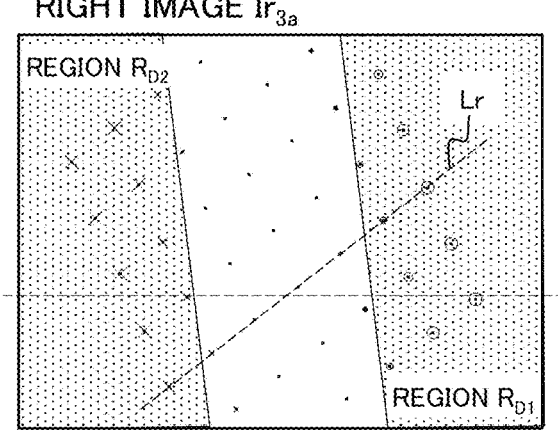
Figure 10B:
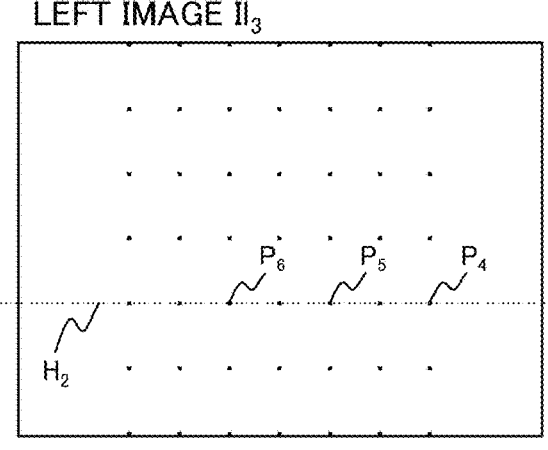
FIG. 10B is an example of how parallax errors appear under installation conditions of the left and right cameras in FIG. 9.
Figure 10B:
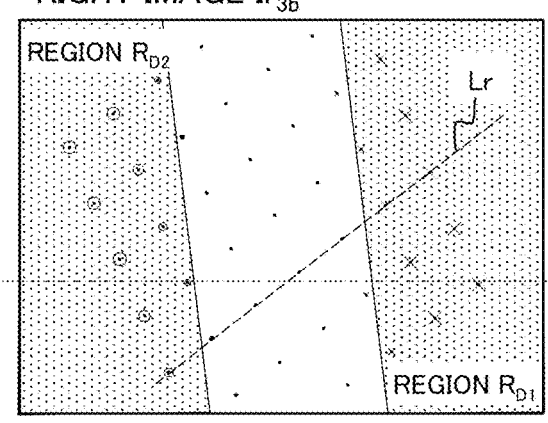

Next, FIG. 9, FIG. 10A, and FIG. 10B are used to describe Modification 2 of this embodiment, which is a method of the distance measurement when the installation conditions of the left and right cameras are different from those in FIG. 5.

FIG. 9 corresponds to the left and right images captured by both cameras when the optical axes of the left and right cameras are parallel but the image sensor plane of the left camera is rotated 30 degrees counterclockwise around the optical axis of the left camera. This imaging condition corresponds to a situation, as the positional relationship of the two cameras and their relationship to the vehicle on which they are mounted, for example, when the X-axis is parallel to the front direction of the vehicle in FIG. 3, the Y-axis is rotated 30 degrees clockwise around the X-axis relative to the level of the vehicle, and the posture of the left camera is level with the vehicle and the right camera is rotated 30 degrees clockwise around the optical axis of the right camera.

In FIG. 9, the right image $Ir_3$ is illustrated collectively for cases where the distance to each point illustrated in the left image $Il_3$ varies within a certain range. Thus, each point in the left image $Il_3$ is a line segment in the right image $Ir_3$.

Although each point in the left image $Il_3$ is illustrated as corresponding to each line segment in the right image $Ir_2$, some of the points on the left image $Il_3$ are outside the area of the right image $Ir_3$ due to the difference in the imaging capturing areas of the left and right cameras. In the illustration of the correspondence between some of the points and some of the line segments, the points $P_4$, $P_5$, and $P_6$ in the left image $Il_3$ in FIG. 9 correspond to the line segments $L_4$, $L_5$, and $L_6$ in the right image $Ir_3$, respectively.

In the example illustrated in FIG. 9, each line segment illustrated in the right image $Ir_3$ is horizontal to the image because the posture of the right camera is the same as a posture of the parallel stereo camera with respect to the baseline connecting the left camera and the right camera (the line segment BL). In other words, adjusting the posture of the camera on the side used to confirm the position on the image for the distance measurement allows making the timing of exposure of each point the same regardless of the distance to the target, even for the rolling-shutter type image sensors.

However, the image capturing line $H_2$ connecting the points $P_4$, $P_5$, and $P_6$ is not parallel to the line Lr connecting the right end (that is, the far side) of the line segments $L_4$, $L_5$, and $L_6$. In other words, even with this combination of the left and right cameras, when the rolling-shutter type image sensor is used, the exposure timing of the ranging target point is different for the left and right cameras depending on the position of the ranging target point captured in the left image $Il_3$.

FIGS. 10A and 10B illustrate how the ranging error appears under the installation conditions of the left camera and the right camera corresponding to FIG. 9 when a magnitude of the exposure time deviation in the positions in the vertical direction due to the rolling shutter effect, the movement of the ranging target OB, and the distance to the ranging target OB are fixed to certain values. FIG. 10A illustrates the captured left and right images under the situation where the ranging target OB moves relatively to the right direction (for example, while the vehicle 100 is turning left), and FIG. 10B illustrates the captured left and right images under the situation where the ranging target OB moves relatively to the left direction (for example, while the vehicle 100 is turning right).

In FIGS. 10A and 10B, for each point in the left image $Il_3$, the corresponding points are illustrated in the right image $Ir_{3a}$ and the right image $Ir_{3b}$, and in the right image $Ir_3a$ and the right image $Ir_{3b}$, the ranging error at each point is indicated by an "o" or "x" around the point. Here, the magnitudes of "o" or "x" indicate the degree of error, with "o" indicating that the error appears as a distance closer than it actually is and "x" indicating that the error appears as a distance farther than it actually is.

For the left and right camera postures in FIG. 9, when the image is divided into a plurality of regions and the exposure timing relationship between the left camera and the right camera is adjusted for each region, an example of the divided regions would be to divide the image into region $R_{D1}$, region $R_{D2}$, and another region illustrated in the right image $Ir_3$ in FIG. 10A and FIG. 10B. Then, for the region $R_{D1}$, the start of exposure by the right camera is delayed relative to the start of exposure by the left camera, and for the region $R_{D2}$, the start of exposure by the right camera is accelerated relative to the start of exposure by the left camera, and in the other region, the start of exposure by the left camera and the right camera are aligned.

Although the appearance of the ranging error in the right image $Ir_{3a}$ in FIG. 10A and the right image $Ir_{3b}$ in FIG. 10B is opposite in perspective due to the effect of different relative movements of the ranging target OB, the divided regions do not differ between the right image $Ir_{3_a}$ and the right image $Ir_{3_b}$ because the areas are determined by the difference in the exposure timing, that is, the difference in the image capturing lines (the vertical positions) in the right image corresponding to the positions on the left image. In other words, the method of dividing the region can be determined independently of the relative movement of the ranging target OB relative to the camera.

However, for the correction of the ranging error itself, the ranging error depends on the direction and degree of change in the relative position of the camera and the ranging target OB. In other words, in the vehicle-mounted cameras, where the relative position changes from time to time in various ways, the relative position change during the period of the exposure time deviation needs to be estimated, which is dependent on the estimation and cannot always be corrected correctly.

<Specific Configuration of the Vehicle-Mounted Control Device 1>

Figure 11:
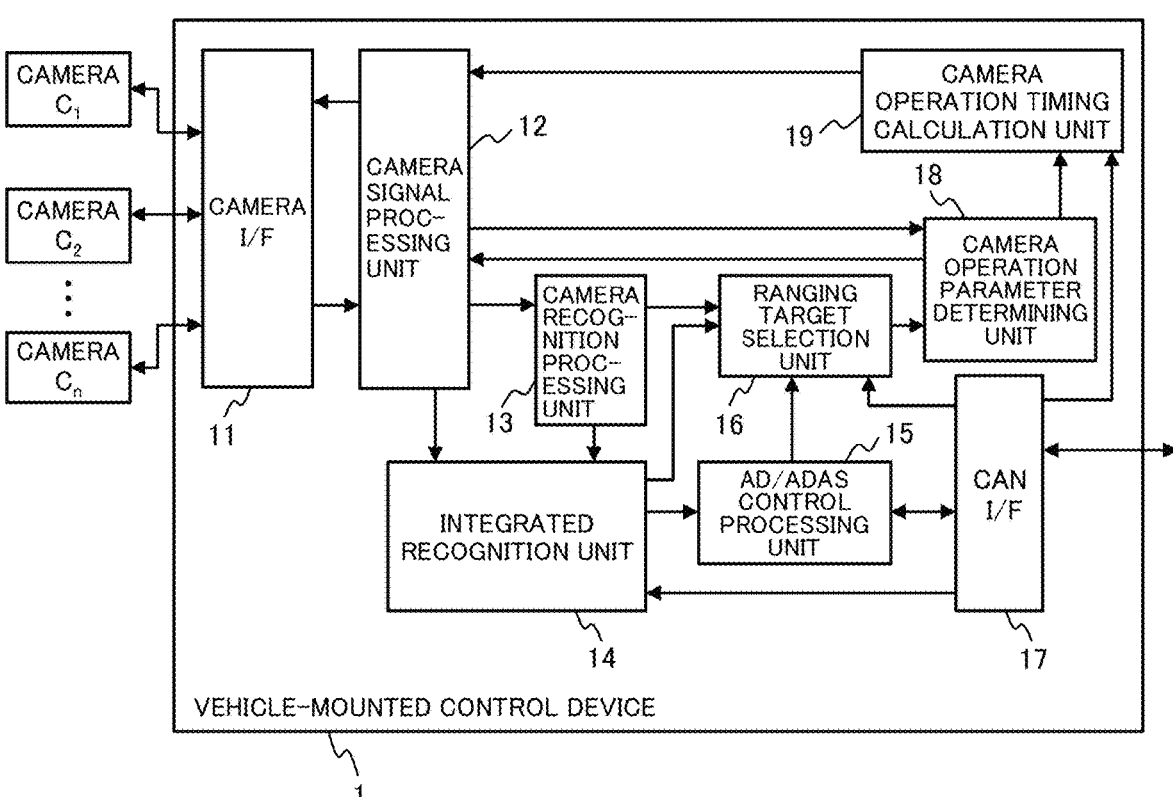
FIG. 11 is an example configuration of a vehicle-mounted control device of Embodiment 1.
Figure 12:
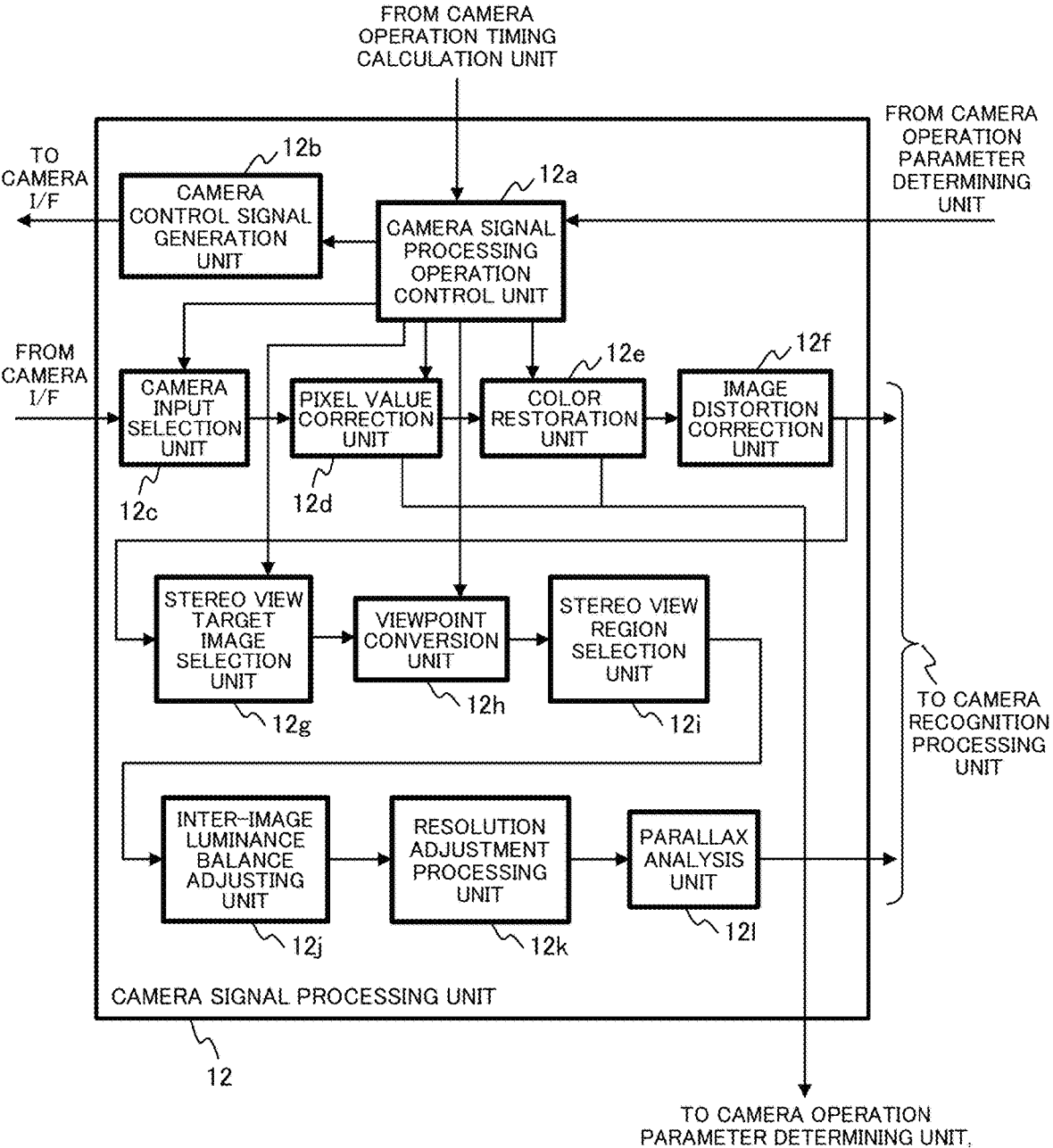
FIG. 12 is an internal configuration example of a camera signal processing unit illustrated in FIG. 11.

Next, FIGS. 11 and 12 are used to illustrate a specific configuration example of a vehicle-mounted control device 1 that executes a three-dimensional information acquisition process described so far. In the following, it is assumed that n cameras (cameras $C_1$ to $C_n$) are mounted on the vehicle 100 to monitor each direction around the vehicle such that image capturing areas of respective cameras overlap. Each camera is connected to the vehicle-mounted control device 1.

As illustrated in FIG. 11, the vehicle-mounted control device 1 includes a camera interface 11, a camera signal processing unit 12, a camera recognition processing unit 13, an integrated recognition unit 14, an AD/ADAS control processing unit 15, a ranging target selection unit 16, a CAN interface 17, a camera operation parameter determining unit 18, and a camera operation timing calculation unit 19. The vehicle-mounted control device 1 is specifically a computer including hardware such as a CPU or another arithmetic unit, a storage device such as semiconductor memory, and a communication device. Then, the arithmetic unit executes a predetermined program to realize each function of the camera signal processing unit 12, the camera recognition processing unit 13, and the like. In the following, the details of each unit will be described sequentially, while omitting such well-known technologies as appropriate.

The camera interface 11 is an interface for connecting the cameras to the vehicle-mounted control device 1 and performs electrical matching and signal format conversion. The camera interface 11 transmits the images captured by the respective cameras and information indicating the operating status of the cameras to the camera signal processing unit 12. Information related to the frame acquisition start timing settings, exposure settings, and the like, which are aggregated and converted by the camera signal processing unit 12 to the format and the like according to the control signals for each camera, is transmitted to each camera.

The camera signal processing unit 12 performs various image processing in addition to the aggregation of the parameters necessary for the operation of each camera. An example of an internal configuration of the camera signal processing unit 12 is described separately using FIG. 12.

The image processing results from the camera signal processing unit 12 are transmitted to the camera recognition processing unit 13, which detects various objects present in the image and recognizes type and status (distance, speed, acceleration, orientation, whether the light emitting object is lit or not, and the like) of each detected object. Information such as the speed and the acceleration is calculated primarily from the time change of the distance.

In the calculation of the distance by the camera recognition processing unit 13, the distance is calculated from parallax information for the same point detected by the camera signal processing unit 12 when the parallax information is available. When the parallax information is not present, for example, the target has not been selected as the ranging target OB, the distance may be estimated using AI (Artificial Intelligence) or the like from images obtained from a single camera. The obtained parallax information may also be given to the AI that estimates the distance, and this configuration allows the AI itself to correct an error in estimating the distance to the object inside the AI, or to acquire the distance to a surrounding object of the object from the parallax information to be used for estimating the distance to the object. In other words, the parallax information can be utilized to improve the accuracy of the distance estimation by the AI. In order to utilize for improving the accuracy of the distance estimation by the AI, the camera recognition processing unit 13 may request the ranging target selection unit 16 to select an object that is important for the AI to perform the distance estimation as the ranging target OB.

The integrated recognition unit 14 evaluates the recognition results of the camera recognition processing unit 13, information related to quality of the captured image of each camera such as exposure state and white balance detected by the camera signal processing unit 12, the travel state of the vehicle (traveling speed, longitudinal acceleration, lateral acceleration, and the like) obtained externally via the CAN interface 17, a driver operation (steering operation, accelerator operation, brake operation, shift lever position, and the like) in an integrated manner. The final recognition results are communicated to the AD/ADAS control processing unit 15. When an external sensor other than the cameras is present, information obtained from the external sensor may be used.

Based on the final recognition results obtained from the integrated recognition unit 14, the AD/ADAS control processing unit 15 takes into account information including the travel state of the vehicle obtained from outside via the CAN interface 17, the driver operation, and the like and generates information necessary for a vehicle control (such as intervention information on the accelerator, the brake, the steering, and the like) and a warning request signal to the driver. The AD/ADAS control processing unit 15 outputs them to an electronic control device of a vehicle control system and an electronic control device of a human-machine interface system via the CAN interface 17.

The ranging target selection unit 16 takes into account the status of the camera recognition processing unit 13, the integrated recognition unit 14, the AD/ADAS control processing unit 15, and the ranging target regions selected in the past several frames, and determines the feature point or the ranging target region on the image to be used as the ranging target OB in the combination of the cameras to be used in the distance measurement process and/or in each combination of the cameras. When focusing on a certain feature point, it is possible to perform the process described using FIG. 6, and when focusing on the ranging target region, it is possible to perform the process illustrated in FIG. 7.

When there are three or more cameras, it can also be considered to select a plurality of combinations of the cameras to be used for the distance measurement simultaneously for simultaneous distance measurement in different directions. When the plurality of combinations of the cameras are selected simultaneously, it can also be considered that the camera serving as the reference for the exposure timing may be shared by the plurality of combinations. For example, when considering two combinations of the three cameras (Cx, Cy, and Cz), one camera (camera Cy) can be treated as the reference for the exposure timing, for a pair of the cameras Cx and Cy and a pair of the cameras Cy and Cz.

By integrating and utilizing not only the result of the camera recognition processing unit 13, but also information from the integrated recognition unit 14 and the AD/ADAS control processing unit 15 with the ranging target selection unit 16, for example, when the AD/ADAS control processing unit 15 determines that an emergency avoidance is necessary, the priority is given to the distance measurement of an object to be avoided, thereby to improve the accuracy of the avoidance operation. In the case where the integrated recognition unit 14 also uses information from the external sensor other than the cameras, when the ranging information from the ranging external sensor for a certain orientation becomes unstable, or when there is a discrepancy in the ranging information acquired by the external sensor monitoring a certain orientation, this allows for flexible responses, such as prioritizing the measurement of the orientation in order to allow ranging accuracy.

The camera operation parameter determining unit 18 determines the settings of the exposure condition, the white balance, and the like for each camera based on the information obtained during the processing by the camera signal processing unit 12, and the position information and the ranging target region information on the images of the respective cameras where the combination of the cameras are selected by the ranging target selection unit 16 and used for the distance measurement of the ranging target OB. The parameters are determined such that the exposure condition and the white balance of a part of the images to be the ranging target OB do not differ significantly in the combination of the cameras used for the ranging target OB, so as not to make it difficult to detect the corresponding relationship of the same point in space between the images obtained with the combinations of the cameras.

The camera operation timing calculation unit 19 calculates the setting parameters for synchronization of each camera based on the parameters determined by the camera operation parameter determining unit 18, information on the image sensor used for each camera (a parameter for controlling synchronization timing, a relationship between a synchronization signal and an exposure timing of each image capturing line), and the position information and the region information on the images of each camera where the combination of the cameras are selected by the ranging target selection unit 16 and used for the distance measurement of the ranging target OB obtained via the camera operation parameter determining unit 18. In this case, as described using FIG. 6, the maximum ranging distance needs to be taken into account. The maximum ranging distance can be fixed according to the performance of the camera to be used. It is also possible to use the recognition results of the surrounding situation (for example, a normal driving or a driving inside an intersection) by the camera recognition processing obtained via the ranging target selection unit 16 and the camera operation parameter determining unit 18. It is also possible to use for determination, the traveling speed, the steering information, and the position information of the subject vehicle on the map obtained via the CAN interface 17.

The setting parameters calculated by the camera operation parameter determining unit 18 and the camera operation timing calculation unit 19 are aggregated in the camera signal processing unit 12 and transmitted to each camera via the camera interface 11.

<Details of the Camera Signal Processing Unit 12>

An example of an internal configuration of the camera signal processing unit 12 is illustrated in FIG. 12. In the example illustrated in FIG. 12, the camera signal processing unit 12 includes a camera signal processing operation control unit 12a, a camera control signal generation unit 12b, a camera input selection unit 12c, a pixel value correction unit 12d, a color restoration unit 12e, an image distortion correction unit 12f, a stereo view target image selection unit 12g, a viewpoint conversion unit 12h, a stereo view region selection unit 12i, an inter-image luminance balance adjusting unit 12j, a resolution adjustment processing unit 12k, and a parallax analysis unit 12l. The detail of each unit will be described sequentially.

The camera signal processing operation control unit 12a performs overall control of the camera signal processing unit 12. For this purpose, the camera signal processing operation control unit 12a first aggregates the information necessary for controlling each camera from the camera operation parameter determining unit 18 and the camera operation timing calculation unit 19. The aggregated signals are transmitted to the camera control signal generation unit 12b, where the aggregated signals are converted to a format suitable for a control signal of each camera and transmitted to each camera via the camera interface 11. In some cases, the timing of transmitting the information corresponding to each camera to the camera control signal generation unit 12b may be delayed taking account of differences in the frame rate of each camera and the delay until the set contents made in the control signals and the like are reflected in the actual captured images. The function of matching each camera format allows the vehicle-mounted control device 1 to connect the cameras of different formats simultaneously.

The camera signal processing operation control unit 12a also has the role of providing information necessary for processing to the various processing units inside the camera signal processing unit 12, taking account of the delay from the time the control signals are set for each camera until the captured images based on these settings are obtained from each camera via the camera interface 11.

The images from each camera and additional information associated with the image capturing enter the camera input selection unit 12c via the camera interface 11. The camera input selection unit 12c selects the cameras and the frames to be processed by a camera signal process 130 at the point according to the instructions from the camera signal processing operation control unit 12a. For example, when there is a camera monitoring a rear of the vehicle 100, the camera signal processing unit 12 processes images from this camera only once every several frames during the normal travelling, and every frame is processed by the camera signal processing unit 12 only when the vehicle is traveling backward, turning right or left, or changing lanes. This allows a computation load during the normal travelling to be suppressed and the computation load to be allocated to the recognition process of travel direction. For the cameras that are used in pairs for the distance measurement, the set of images of the frames that will be used in the distance measurement process should always be selected as a set.

The camera input selection unit 12c transmits the image of each selected camera frame to the pixel value correction unit 12d, and the pixel value correction unit 12d performs a pixel value correction of the image. This pixel value correction takes account of the sensitivity characteristics of each camera, the exposure condition set for each camera, and a nonlinear compression setting for pixel values in an image data output, and corrects them such that the relationship between the actual brightness corresponding to each pixel and the pixel value is linear for each image obtained from each camera. The values of pixels with the same brightness between images obtained with the different cameras are corrected such that the values of pixels with the same brightness become roughly the same. In this case, the camera also corrects the phenomenon in which a periphery of the image becomes darker than it actually is (that is, the pixel value becomes small) due to the lens characteristics of the camera. Information necessary to take account of the exposure condition set for each camera and the compression setting for pixel values in the image data output is acquired from the camera signal processing operation control unit 12a.

The images having undergone pixel value correction in the pixel value correction unit 12d are transmitted to the color restoration unit 12e, which restores the color information. When restoring the color information, the white balance information set for each camera is acquired from the camera signal processing operation control unit 12a, and the white balance settings are taken into account. Depending on the configuration of the camera and the configuration of the image sensor used in the camera, the color restoration processing may require referring to the information of neighboring pixels to perform arithmetic process for the color restoration. The color restoration unit 12e also performs this processing.

Depending on the configuration of the image sensor used in the camera, the image may be restored from complementary colors or only some of the colors. When the color filters of the two cameras used for the distance measurement are different, a grayscale image is also generated for the distance measurement processing.

The image having undergone the color restoration in the color restoration unit 12e is transmitted to the image distortion correction unit 12f to correct the image distortion. Since a distortion often occurs in the periphery of image in the actual camera due to the lens characteristics effect, a local scaling processing is applied to each part of the image to correct the image distortion such that the image is free of the distortion as obtained in an ideal pinhole camera capturing. When the camera is a fisheye camera, it might not be possible to obtain a distortion-free image over the entire image capturing area. Thus, the image is divided into a plurality of regions and handled as necessary. In this case, an image that contains a single region to be used for distance measurement should be prepared, taking the distance measurement processing in the subsequent stage into account.

The images having undergone distortion correction by the image distortion correction unit 12f are transmitted to the camera recognition processing unit 13 and also to the stereo view target image selection unit 12g. The images transmitted from the image distortion correction unit 12f to the camera recognition processing unit 13 are basically in units of image obtained from each camera and used to detect various objects present in each image and to recognize the detection target.

The images transmitted to the stereo view target image selection unit 12g, in which the stereo view target image selection unit 12g selects only the images obtained by the two cameras to be combined for use in the distance measurement, are transmitted to the viewpoint conversion unit 12h. When selecting the images, the stereo view target image selection unit 12g uses the information related to selection of the ranging target OB obtained from the camera signal processing operation control unit 12a. Taking the later processing into account, the images used for the distance measurement are paired, and information on the posture of the camera that acquired each image and the posture of the paired camera is also added. A plurality of pairs of two cameras may be selected simultaneously, and the distance measurement process may be performed at a later stage for each combination.

In the viewpoint conversion unit 12h, for each pair of the images obtained from the two cameras used for the distance measurement, the images from the two cameras are transformed such that the images become equivalent to images used in parallel stereo viewing. In other words, the respective two cameras are considered to be the left and right cameras. As illustrated in FIG. 3, the image captured by the left camera is considered to be the image projected onto the left camera image sensor surface Cl and converted into an image on the virtual left camera image sensor surface Vl, while the captured image by the right camera is considered to be the image projected onto the right camera image sensor surface Cr and converted into an image on the virtual right camera image sensor surface Vr.

The viewpoint conversion unit 12h further converts the position information on the ranging target region and the feature points on the image by stereo viewing obtained from the camera signal processing operation control unit 12a into the region in the image and the position information on the image after the image conversion by the viewpoint conversion unit 12h.

The images converted by the viewpoint conversion unit 12h, information on the ranging target region to which the stereo view processing is applied, the position information on the feature points on the images, and information necessary for adjusting the images in the subsequent processing are transmitted to the stereo view region selection unit 12i. The region of the image for the stereo view processing for each pair of images obtained from the two cameras used for the distance measurement is cut out. Even when the ranging target is a feature point, information on the images around the feature point is necessary to map the same feature point with the two cameras, and the position in the image on the other side of the reference image changes depending on the distance to the feature point. Therefore, the image is cut out as a region with a certain size, including the area around the feature point.

By using the stereo view region selection unit 12i to cut out the region of the image to be used as the ranging target OB, the size of the image to be targeted in subsequent processing can be limited, and the processing load can be suppressed. When confirming the brightness of the entire image, which is necessary for the inter-image luminance balance adjusting unit 12j to perform its processing, it also has the effect of eliminating the influence of image brightness in regions that are not used for the distance measurement.

The pair of images obtained from the two cameras used for the distance measurement, which becomes the output of the stereo view region selection unit 12i, is transmitted to the inter-image luminance balance adjusting unit 12j, along with the necessary information for image adjustment in the subsequent processing. The inter-image luminance balance adjusting unit 12j performs a pixel value correction such that the brightness of the entire image becomes close between the images obtained from the two cameras.

The pair of images obtained from the two cameras used for the distance measurement, whose luminance has been adjusted in the inter-image luminance balance adjusting unit 12*j*, are transmitted to the resolution adjustment processing unit 12*k* along with the information necessary for image adjustment in the subsequent processing, where a filter processing is performed to allow a similar spatial resolution between the images and across the respective images. Due to the difference in the specifications of the cameras used to acquire the images and the effects of the processing in the viewpoint conversion unit 12*h*, there may be a large difference in spatial resolution between the images acquired by the two cameras used for the distance measurement, or even the images acquired by each camera, depending on their position in the image. Since this difference in spatial resolution may interfere with the mapping of points used for the distance measurement, a filter processing is performed in the resolution adjustment processing unit 12*k*.

The pair of images obtained from the two cameras used for the distance measurement, which has been filtered by the resolution adjustment processing unit 12*k*, is transmitted to the parallax analysis unit 12*l*, which extracts the same feature points used for the distance measurement between the pair of images, and calculates the distances to the feature points by a triangulation based on the positional relationship between the feature points on the image and the positional relationship of the positions of the two cameras that have acquired the pairs of images. A large number of the feature points may be detected to the extent that they can be processed.

When mapping the feature points, the feature points on one image is necessary to be also searched on the other image. As illustrated in FIG. 5, once the points on the reference image (the left image Il in FIG. 5) are determined, the areas of the corresponding points on the other image (right image Ir in FIG. 5) are determined as the line segments. Thus, it is sufficient that the search is basically performed within the area of the line segment. However, when determining the line segment, it is necessary to take the image conversion by the viewpoint conversion unit 12*h* into account. Taking account of the effects of camera manufacturing errors, the mounting error on the vehicle, and the differences in exposure time, in practice, the line segment need to provide some range for the search.

The information on the locations of the feature points and the distances to the feature points extracted by the parallax analysis unit 12*l* is transmitted to the camera recognition processing unit 13 along with the information on the two cameras that have acquired the images used for the distance measurement. This information is used by the camera recognition processing unit 13 to perform the recognition processing, taking distance information into account.

The information on a pixel value distribution trend of the image used by the pixel value correction unit 12*d* for the pixel value correction and a color distribution trend of the image used by a color conversion unit 137 for white balance adjustment is transmitted to the camera operation parameter determining unit 18 and the integrated recognition unit 14. Using this information, the camera operation parameter determining unit 18 can adjust the setting parameters for the following exposure of each camera, and the integrated recognition unit 14 can evaluate the difficulty of recognizing the images obtained from each camera and determine which recognition result based on the information from the camera (or which external sensor, when an external sensor other than the camera is connected) to prioritize for use.

Although this embodiment has been described based on the left camera, it can also be considered to be the same based on the right camera. It can also be applied when the left and right cameras have different image sensors and different frame rates and resolutions. When the frame rate is different, it is only necessary to adjust the exposure timing of the point that is the ranging target OB considering the frame rate. Even when the resolution is different, the distance can be calculated by the parallax analysis unit 12*l* by using the function of the resolution adjustment processing unit 12*k* to obtain parallax.

As described above, the vehicle-mounted control device according to the embodiment, selecting a pair of cameras including at least one rolling-shutter type camera and capable of image capturing some identical ranging target, from a plurality of cameras mounted in various positions and in various orientations on the vehicle, and controlling the exposure timing of the rolling-shutter type camera according to the ranging target when acquiring three-dimensional information around the vehicle on the basis of a pair of captured images by this pair of cameras allows suppressing the ranging error when calculating the distance to a target in the manner of triangulation by stereo vision.

Embodiment 2

Figure 13A:
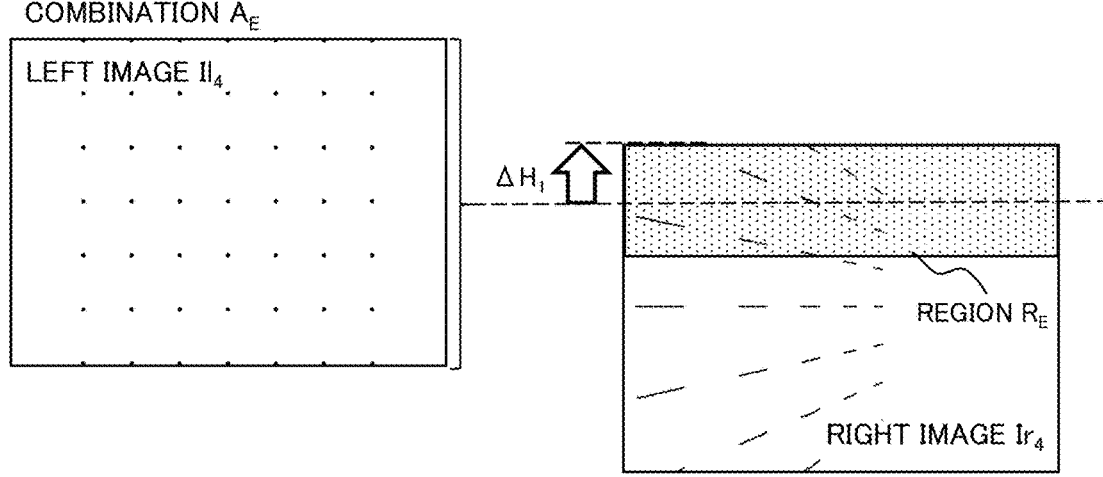
FIG. 13A is an example of an image capturing timing by a vehicle-mounted control device of Embodiment 2.
Figure 13B:
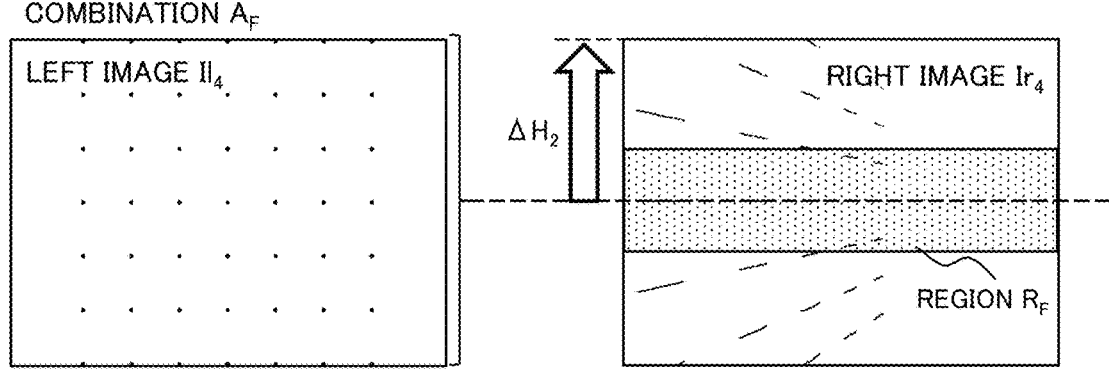
FIG. 13B is an example of an image capturing timing by a vehicle-mounted control device of Embodiment 2.
Figure 13C:
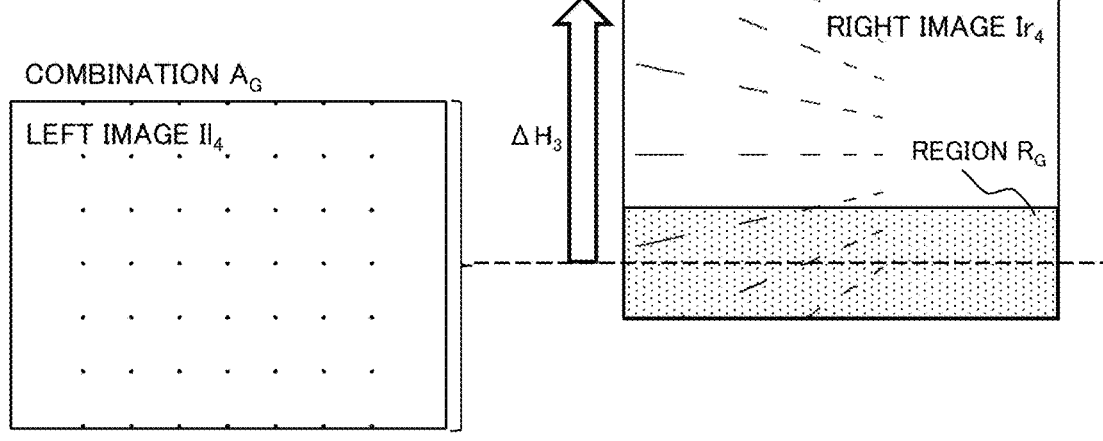
FIG. 13C is an example of an image capturing timing by a vehicle-mounted control device of Embodiment 2.

Next, a vehicle-mounted control device 1 according to Embodiment 2 of the present invention is described using FIGS. 13A to 13C. In the following, duplicate explanations of the points in common with Embodiment 1 will be omitted.

Embodiment 1 uses the rolling-shutter type image sensors in both the left and right cameras. In this embodiment, one of the left and right cameras uses a global-shutter type image sensor and the other uses the rolling-shutter type image sensor. In this case, the image capturing timing controls illustrated in FIGS. 13A to 13C are used instead of the image capturing timing controls illustrated in FIGS. 7A to 7C of Embodiment 1. In other words, a control is employed to switch the image capturing timing of the global-shutter type camera according to a region of interest on the image captured by the rolling-shutter type camera.

FIGS. 13A to 13C illustrate an example of image capturing timing for each camera when the left camera is a global-shutter type camera and the right camera is a rolling-shutter type camera. Since the left image $Il_4$ by the left camera of the global-shutter type is an instantaneously exposed image, the center in the vertical direction of the image is illustrated as the exposure timing for the entire image for illustrative purposes. On the other hand, the right image $Ir_4$ by the rolling-shutter type right camera is an image sequentially exposed from the upper image capturing lines. Thus, the position of each image capturing line in the image (position in the vertical direction) illustrates the exposure timing.

In this embodiment, the right image $Ir_4$ region is divided into three regions in the vertical direction in order to reduce the timing deviation between the left and right cameras capturing the same feature point as much as possible, thereby reducing degradation of the accuracy of distance measurement, and the combination of the image capturing timings for the left and right images is to be switched depending on which region is the ranging target.

Specifically, as illustrated in FIG. 13A, when the feature points projected in the upper region $R_E$ of the right image $Ir_4$ is the ranging target, the exposure timings of both cameras are set to the combination $A_E$. The right camera exposure starts earlier than the left camera for a period equivalent to the period required for the right camera to expose the $\Delta H_1$ lines in the center of the region $R_E$.

As illustrated in FIG. 13B, when the feature points projected in the center region $R_F$ of the right image $Ir_4$ are the ranging target, the exposure timings of both cameras are set to the combination $A_F$. The right camera exposure starts earlier than the left camera for a period equivalent to the period required for the right camera to expose the $\Delta H_2$ lines in the center of the region $R_F$.

Furthermore, as illustrated in FIG. 13C, when the feature points projected in the lower region $R_G$ of the right image $Ir_4$ are the ranging target, the exposure timings of both cameras are set to the combination $A_G$, and the right camera exposure starts earlier than the left camera for a period equivalent to the period required for the right camera to expose the $\Delta H_a$ lines in the center of the region $R_G$.

Changing the combination of the exposure start timings of the left image $Il_4$ and the right image $Ir_4$ according to the region of the image allows the exposure timing of the region of the right image $Ir_4$ to be made closer to the exposure timing of the left image 114.

In other words, dividing the region into three regions as illustrated in FIG. 13 and adjusting the exposure timing according to the region allows suppressing the difference in the exposure timings of the cameras used as a pair for the distance measurement in each region, compared with the case where the exposure timing is not divided into regions. Accordingly, the ranging error due to the difference in exposure timing is suppressed.

Since the method described in this document is only required to suppress the difference in the exposure timings of the cameras used as a pair for the position and the area as the ranging target OB for the distance measurement, this is applicable even when the rolling-shutter type image sensor is used for the left camera and the global-shutter type image sensor is used for the right camera. The region may be divided more finely to reduce the difference in the exposure timing.

REFERENCE SIGNS LIST

100: Vehicle
1: Vehicle-mounted control device
11: Camera interface
12: Camera signal processing unit
12a: Camera signal processing operation control unit
12b: Camera control signal generation unit
12c: Camera input selection unit
12d: Pixel value correction unit
12e: Color restoration unit
12f: Image distortion correction unit
12g: Stereo view target image selection unit
12h: Viewpoint conversion unit
12i: Stereo view region selection unit
12j: Inter-image luminance balance adjusting unit
12k: Resolution adjustment processing unit
12l: Parallax analysis unit
13: Camera recognition processing unit
14: Integrated recognition unit
15: AD/ADAS control processing unit
16: Ranging target selection unit
17: CAN interface
18: Camera operation parameter determining unit
19: Camera operation timing calculation unit
C: Camera
Cl: Left camera image sensor surface
$Cl_{OA}$: Left camera optical axis
fl: Left camera focal length
Vl: Virtual left camera image sensor surface $Vl_{OA}$: Virtual left camera optical axis
sl: Virtual left camera focal length
Cr: Right camera image sensor surface
$Cr_{OA}$: Right camera optical axis
fr: Right camera focal length
Vr: Virtual right camera image sensor surface
$Vr_{OA}$: Virtual right camera optical axis
sr: Virtual right camera focal length
OB: Ranging target
I: Image
Il: Left image
Ir: Right image

The invention claimed is:

1. A vehicle-mounted control device that communicates with a plurality of cameras including at least two cameras, the at least two cameras including a first camera with a rolling-shutter type image sensor, the vehicle-mounted control device comprising:

at least a computer comprising a memory, the computer configured to measure a distance to a ranging target using a plurality of images captured with the at least two cameras including the first camera and a second camera, the second camera being capable of capturing a same ranging target in at least part of an image capturing region of the first camera; and adjust an exposure timing of at least one of the first camera or the second camera based on a ranging position of at least one of the plurality of images;

select a portion prioritizing ranging accuracy as the ranging position on the image; and sets a plurality of divided regions on the image acquired by the first camera or the second camera, and adjusts the exposure timing based on a position of the divided region including the ranging target.

2. The vehicle-mounted control device according to claim 1, wherein the vehicle-mounted control device is configured to:

obtains a second coordinate of the ranging target on the image acquired by the second camera based on a first coordinate of the ranging target on the image acquired by the first camera and information on locations of the first camera and the second camera; and adjusts the exposure timing based on the first coordinate and the second coordinate.

3. A vehicle-mounted control device that communicates with a plurality of cameras including at least two cameras, the at least two cameras including a first camera with a rolling-shutter type image sensor, the vehicle-mounted control device comprising:

at least a computer comprising a memory, the computer configured to measure a distance to a ranging target using a plurality of images captured with the at least two cameras, the at least two cameras including the first camera and a second camera, the second camera being capable of capturing a same ranging target in at least part of an image capturing region of the first camera; and adjust an exposure timing of at least one of the first camera or the second camera based on a ranging position of at least one of the plurality of images; and set a plurality of divided regions on the image acquired by the first camera or the second camera, and adjust the exposure timing by sequentially selecting the divided regions, wherein the vehicle-mounted control device switches an order in which the divided regions are selected sequentially, according to a travel state of the vehicle including the vehicle-mounted control device.

4. The vehicle-mounted control device according to claim 1, wherein the vehicle-mounted control device is further configured to:

set a plurality of divided regions on the image acquired by the first camera or the second camera, and adjust the exposure timing by sequentially selecting the divided regions, and switch an order of sequential selection of the divided regions according to a driving operation status of a driver of a vehicle including the vehicle-mounted control device.

5. The vehicle-mounted control device according to claim 1, wherein the vehicle-mounted control device adjusts the exposure timing so as to give priority to an object to be avoided for measuring a distance thereof when an emergency avoidance is determined to be necessary.

6. The vehicle-mounted control device according to claim 1, wherein when ranging information from a ranging external sensor other than the first camera or the second camera becomes unstable, the vehicle-mounted control device adjusts the exposure timing to give priority to the region that was being measured by the ranging external sensor to measure the distance.

7. The vehicle-mounted control device according to claim 1, wherein the vehicle-mounted control device has a function to estimate a distance to an object and adjusts the exposure timing for measuring the distance to the object using the function of estimating the distance.

8. The vehicle-mounted control device according to claim 1, wherein the optical axes of the first camera and the second camera are non-parallel.

9. The vehicle-mounted control device according to claim 1, wherein the second camera is a camera with a global-shutter type image sensor.

10. A three-dimensional information acquisition method for acquiring three-dimensional information based on captured images from a plurality of cameras, the plurality of cameras including a first camera with a rolling-shutter type image sensor, the three-dimensional information acquisition method comprising:

a step of measuring a distance to a ranging target using a plurality of images captured with a first camera and a second camera, the second camera being capable of capturing a same ranging target in at least part of an image capturing region of the first camera; and a step of adjusting an exposure timing of at least one of the first camera or the second camera based on a ranging position of at least one of the plurality of images;

a step of selecting a portion prioritizing ranging accuracy as the ranging position of the image;

a step of setting a plurality of divided regions on the image acquired by the first camera or the second camera, and adjusting the exposure timing based on a position of the divided region including the ranging target.

* * * * *